(12) United States Patent
Abouodah et al.

(10) Patent No.: US 12,545,598 B2
(45) Date of Patent: Feb. 10, 2026

(54) WATER REMEDIATION SYSTEM FOR REMOVING CONTAMINANTS FROM A WATER SOURCE

(71) Applicant: Accelerated Remediation Technologies, Olathe, KS (US)

(72) Inventors: Mohamed Abouodah, Spring Hill, KS (US); Nidal Rabah, Marlboro, NJ (US)

(73) Assignee: Accelerated Remediation Technologies, Olathe, KS (US)

( * ) Notice: Subject to any disclaimer, the term of this patent is extended or adjusted under 35 U.S.C. 154(b) by 374 days.

(21) Appl. No.: 18/194,639

(22) Filed: Apr. 2, 2023

(65) Prior Publication Data

US 2024/0025766 A1    Jan. 25, 2024

Related U.S. Application Data

(60) Provisional application No. 63/390,404, filed on Jul. 19, 2022.

(51) Int. Cl.
  *C02F 1/20*       (2023.01)
  *B09C 1/00*       (2006.01)
  *C02F 101/32*     (2006.01)
  *C02F 101/36*     (2006.01)
  *C02F 103/06*     (2006.01)

(52) U.S. Cl.
  CPC .............. *C02F 1/20* (2013.01); *B09C 1/002* (2013.01); *B09C 2101/00* (2013.01); *C02F 2101/322* (2013.01); *C02F 2101/36* (2013.01); *C02F 2103/06* (2013.01)

(58) Field of Classification Search
  CPC .. C02F 1/20; C02F 2101/322; C02F 2101/36; C02F 2103/06; C02F 7/00; B09C 1/002; B09C 2101/00
  USPC .................... 210/120, 136, 170.04
  See application file for complete search history.

(56) References Cited

U.S. PATENT DOCUMENTS

| 5,246,309 A | * | 9/1993 | Hobby | .................... B09C 1/002 210/615 |
| 6,305,878 B1 | * | 10/2001 | Drucker | ................. B09C 1/002 210/170.07 |

(Continued)

FOREIGN PATENT DOCUMENTS

KR           1691425 B1 * 12/2016 ................ C02F 1/20

*Primary Examiner* — Vickie Y Kim
(74) *Attorney, Agent, or Firm* — AVEK IP, LLC

(57) ABSTRACT

A device may include a compressor for generating portions of compressed air, and a submersible pump submerged in the water pool. A device may include an air sparger operably coupled to the compressor for injecting a portion of the compressed air into the water pool. A device may include a sprayer submerged in the water pool, the sprayer being operably coupled to both the submersible pump and the compressor through a venturi connection, the sprayer being configured to collectively spray into the water pool a combination of water from the submersible pump and another portion of compressed air. A device may include a vacuum pump configured to charge an air section with a vacuum. The sprayer and the air sparger are configured to generate foam having contaminants, the foam being configured to release contaminants into the air section. The vacuum pump directs the contaminants out of the air section.

19 Claims, 5 Drawing Sheets

(56) References Cited

U.S. PATENT DOCUMENTS

Figure 1:
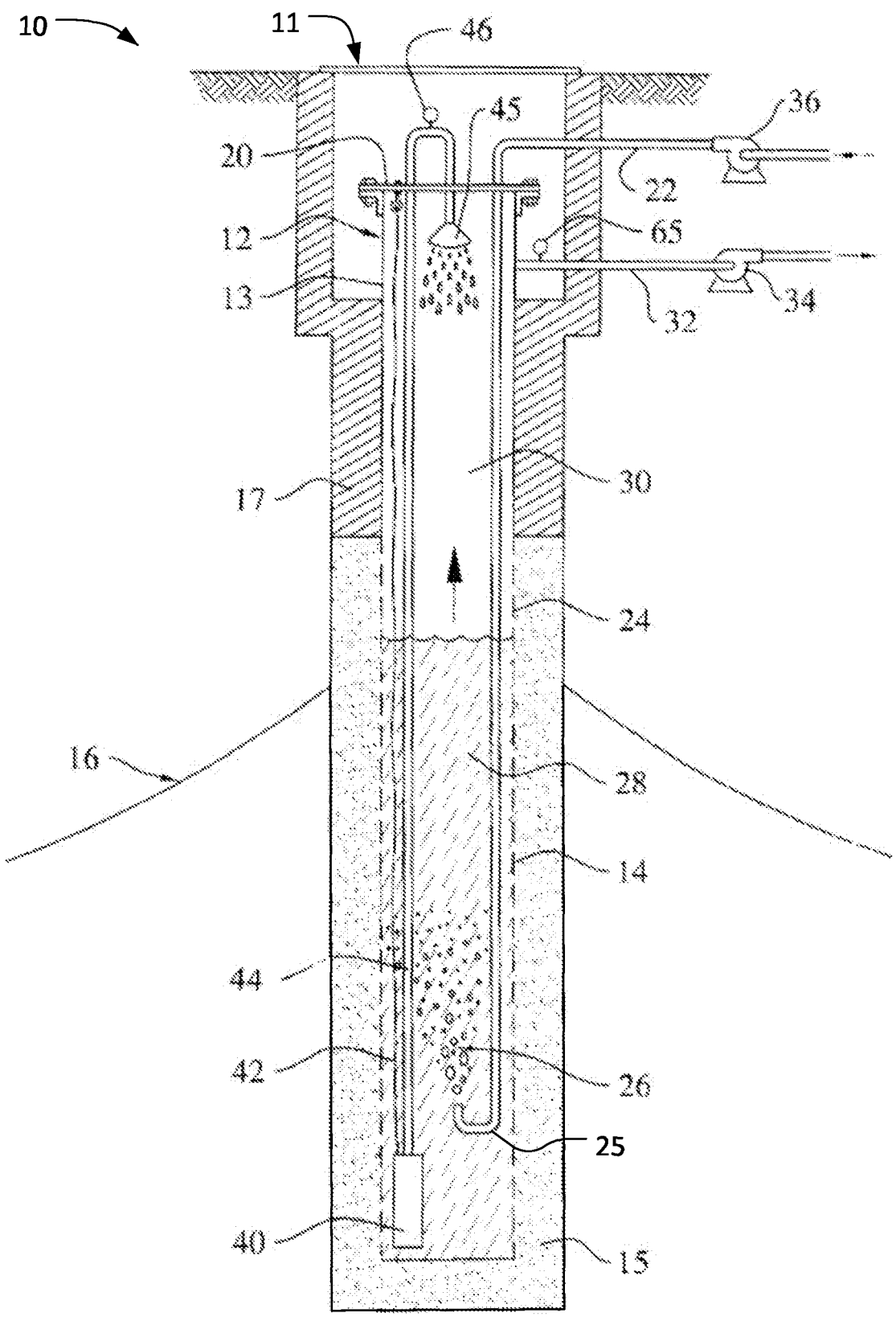

| | | | |
|---|---|---|---|
| 6,557,633 B2* | 5/2003 | Abouodah | B09C 1/002 |
| | | | 166/372 |
| 6,887,333 B1* | 5/2005 | Kessler | B65C 9/1873 |
| | | | 156/272.2 |
| 6,998,006 B1* | 2/2006 | Kessler | B65C 3/14 |
| | | | 156/DIG. 25 |
| 10,752,521 B2 | 8/2020 | Nelson | |
| 2004/0237782 A1* | 12/2004 | Decker | B01D 53/78 |
| | | | 95/211 |
| 2009/0260799 A1* | 10/2009 | Drucker | B09C 1/002 |
| | | | 166/67 |
| 2020/0399143 A1* | 12/2020 | Bitterly | B01D 3/08 |

\* cited by examiner

WATER REMEDIATION SYSTEM FOR REMOVING CONTAMINANTS FROM A WATER SOURCE

RELATED APPLICATIONS

This application claims priority to U.S. Provisional Application No. 63/390,404, filed Jul. 19, 2022, the disclosure of which is incorporated herein by reference in its entirety.

FIELD OF THE DISCLOSURE

The disclosure relates to systems and methods for removing contaminants from a groundwater source. More specifically the disclosure relates to systems and methods for in-situ removal of contaminants from groundwater including water injection and water spraying.

BREIF SUMMARY OF INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

In some aspects, the techniques described herein relate to a water remediation system being situated at a site having a well with a water pool, the water pool having an upper surface and an air section above the water pool, the system including: a compressor for generating a first portion of compressed air and a second portion of compressed air; a submersible pump submerged below the upper surface of the water pool, the submersible pump being configured to pump a source of water at a first rate; an air sparger operably coupled to the compressor, the air sparger being configured to inject the first portion of compressed air into the water pool; a sprayer submerged a distance below the upper surface of the water pool, the sprayer being operably coupled to both the submersible pump and the compressor through a venturi connection, the sprayer being configured to collectively spray into the water pool at a second rate a combination of the source of water from the submersible pump and the second portion of compressed air; and a vacuum pump configured to charge the air section with a vacuum; wherein: the sprayer and the air sparger are configured to generate foam having contaminants, the foam being configured to release contaminants into the air section; and the vacuum pump directs the contaminants out of the air section.

In some aspects, the techniques described herein relate to a system, wherein the contaminants include per- and polyfluoroalkyl substances.

In some aspects, the techniques described herein relate to a system, wherein the second rate is disparate from the first rate.

In some aspects, the techniques described herein relate to a system, wherein the second rate is higher than the first rate.

In some aspects, the techniques described herein relate to a system, wherein the water remediation system is arranged entirely at the site of the well.

In some aspects, the techniques described herein relate to a system, wherein the upper surface of the well rises during operation of the water remediation system.

In some aspects, the techniques described herein relate to a system, further including a permeable upper screen and a permeable lower screen arranged below the upper screen.

In some aspects, the techniques described herein relate to a system, wherein water from the water pool circulates out of the water pool through the upper screen, and circulates back into the water pool through the lower screen.

In some aspects, the techniques described herein relate to a system, further including a blind section, the blind section being an area between the upper screen and the lower screen that is devoid of water permeable screens.

In some aspects, the techniques described herein relate to a system, wherein the distance the sprayer is submerged below the upper surface of water pool is in a range of about two to five feet.

In some aspects, the techniques described herein relate to a system, further including a non-permeable casing arranged around a portion of the air section.

In some aspects, the techniques described herein relate to a system, further including a permeable casing arranged around a portion of the water pool, the permeable casing containing at least one of sand and gravel.

In some aspects, the techniques described herein relate to a system, further including a lid and a power line, the power line being coupled to both the lid and the submersible pump, the power line being configured to provide power to the submersible pump.

In some aspects, the techniques described herein relate to a system, wherein the water remediation system only injects water and air below the upper surface of the water pool.

In some aspects, the techniques described herein relate to a water remediation system being situated at a site having a well with a water pool, the water pool having an upper surface and an air section above the water pool, the system including: a compressor for generating compressed air; a submersible pump submerged below the upper surface of the water pool, the submersible pump being configured to pump a source of water; an air sparger operably coupled to the compressor, the air sparger being configured to inject the compressed air into the water pool; a sprayer being operably coupled to the submersible pump; and a vacuum pump configured to charge the air section with a vacuum; wherein: the air sparger is configured to generate foam having contaminants, the foam being configured to release contaminants into the air section; the sprayer is configured to spray water from the submersible pump; and the vacuum pump directs the contaminants out of the air section.

In some aspects, the techniques described herein relate to a system, wherein the sprayer is arranged above the upper surface of the water pool and is configured to spray water from the submersible pump into the air section.

In some aspects, the techniques described herein relate to a system, further including a perforated screen arranged between the sprayer and the upper surface of the water pool, the perforated screen having a catalyst material.

In some aspects, the techniques described herein relate to a system, wherein the sprayer is arranged below the upper surface of water pool and is configured to spray water from the submersible pump directly into the water pool.

In some aspects, the techniques described herein relate to a system, wherein the sprayer is operably coupled to the compressor by a venturi connection, and is further configured to spray air from the compressor directly into the water pool.

In some aspects, the techniques described herein relate to a water remediation system being situated at a site having a well with a water pool, the water pool having an upper surface and an air section above the water pool, the system including: a compressor for generating a first portion of compressed air and a second portion of compressed air; a submersible pump submerged below the upper surface of the water pool, the submersible pump being configured to pump a source of water; a venturi connection coupled to the compressor and configured to direct the second portion of compressed air; a sprayer submerged a distance below the upper surface of the water pool, the sprayer being operably coupled to both the submersible pump and the venturi connection, the sprayer being configured to collectively spray into the water pool a combination of the source of water from the submersible pump and the second portion of compressed air from the venturi connection; and a vacuum pump configured to charge the air section with a vacuum; wherein: the sprayer is configured to generate foam having contaminants, the foam being configured to release contaminants into the air section; and the vacuum pump directs the contaminants out of the air section.

BRIEF DESCRIPTION OF THE SEVERAL VIEWS OF THE DRAWINGS

Illustrative embodiments of the present disclosure are described in detail below with reference to the attached drawing figures.

FIG. 1 is a schematic view of a water remediation system, according to an embodiment of the disclosure.

FIG. 2 is another schematic view of the water remediation system of FIG. 1.

FIG. 3 is yet another schematic view of the water remediation system of FIG. 1, according to an embodiment of the disclosure.

FIG. 4 is a detailed schematic view of the water remediation system of FIG. 1.

FIG. 5 is a schematic view of a water remediation system, according to another embodiment of the disclosure.

DETAILED DESCRIPTION

It is known in the art that the presence of certain contaminants (e.g., organic compounds) in water sources (e.g., groundwater wells, ponds, lakes, etc.) can be undesirable. These contaminants can have a detrimental effect on those that drink or otherwise use the contaminated water sources and are generally referred to as volatile organic compounds (or "VOCs"). Water sources are sometimes contaminated from leeching that is the result of spills and leaks from storage facilities, or of surface contaminant discharges. Some common types of contaminants are petroleum products and organic compounds incorporating various percentages of chlorine moieties on the molecule.

Techniques for removing these contaminants from water sources have been developed over time. One prior art technique of clearing VOCs from water sources has been the use of ex-situ, or off-site, air stripping of contaminates which makes use of gas liquid partitioning. Gas liquid partitioning operates on the principle that the VOCs will redistribute themselves between a liquid layer and gas layer to achieve an equilibrium state between the two layers. By exposing contaminated water to uncontaminated air, the contaminants in the water will be drawn out and absorbed by the air. In this way, the concentration of VOCs in the water may be reduced to safer levels. To effectuate this process, in the ex-situ methodology, water from a contaminated water source is pumped to the ex-situ air stripping (EAS) facility where it is treated and made safe for use. Air stripping involves spraying water having VOCs into the air of a closed system. The spraying aerosolizes the water or reduces the water to small drops/particles. This significantly increases the surface area of the contaminated water which is exposed to the air. Greater surface area contact between the air and water facilitates both the releasing of the VOCs from the water and the subsequent absorption of the VOCs by the air.

Typically, in an EAS operation, contaminated groundwater is pumped out of the ground to a treatment facility, treated, and then discharged. One drawback of this process is that there is a significant cost attached to extracting and routing large volumes of water from the ground and to a treatment facility. Another drawback may be that the extraction of the contaminated water presents some difficulties as contaminants may reside in the water source in a variety of conditions. For example, the contaminants may be absorbed by nearby soil, which many leech back into the water source. As another example, the contaminants may be largely located at the bottom of the water source due to the density of the contaminants being higher than that of water. As still another example, pockets of contaminants may become isolated from the main source of water in what is known as "dead zones," which are significantly more difficult to remove. These complications may set back the cleaning of the water source by years, in some cases.

An alternative method of water source remediation is known as air sparging. Air sparging is roughly similar to air stripping in concept in that the sparging relies on gas liquid phase partitioning of the VOCs. With air sparging, compressed air is injected into a contaminated water source to create air bubbles therein. The air bubbles travel through the water and adjacent soil during which time the VOCs are partitioned between the air and the liquid. The air bubbles then migrate to a vapor extraction area where the now contaminated air is removed. Typically, air sparging is operated on an in-situ, or on-site, basis by drilling one or more wells in the area of the contaminated water, inserting air injection apparatus down into the well, and forcing air or another gas into the contaminated water. The injected gas rises through the water at the well site and is drawn off at the well head by a vacuum.

In-situ air sparging may be less costly than the EAS process since the air sparging process does not require an additional above-ground treatment facility, or require pumping water to that facility. It will be appreciated that with EAS, wells must be initially drilled to extract the contaminated groundwater. Another advantage of air sparging may be that the oxygen of the air injected into the subsurface water may enhance bio-degradation, through oxidation, of the VOCs.

Despite the advantages of EAS and air sparging, there are still drawbacks associated with these prior art systems. For example, these systems tend to waste water which is otherwise usable. Existing systems must inject water in order to replace contaminated water. Additionally, while there exists prior art system for addressing the presence of VOCs in water sources, there is little in the way of addressing Per- and polyfluoroalkyl Substances (PFASs) that are contaminating a water source. Furthermore, the prior art systems have inefficiencies and complications associated therewith, especially when attempting to address the presence of PFASs in a water source. Existing systems can be expensive to implement as well due to how much energy is required for water movement.

Thus, there is a long-felt need in the art for an improved water remediation system. Embodiments of a water treatment system and methods of using same may remedy these issues at least in part.

In the following description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure. The following detailed description is, therefore, not to be taken in a limiting sense.

As used herein, the terminology such as vertical, horizontal, top, bottom, front, back, end, sides and the like are referenced according to the views, pieces and figures presented. It should be understood, however, that the terms are used only for purposes of description, and are not intended to be limiting. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Any combination of one or more computer-usable or computer-readable media may be utilized to perform the functions described herein, in embodiments. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

In embodiments, a high rate spray system for raising the water level and increasing the vacuum force at the upper portion of the well is provided. In more embodiments, water may be sprayed below the water table (e.g., an upper surface of the well water pool) to provide for a water remediation system that is more efficient at removing PFASs from the water source. In more embodiments, air spraying and air sparging techniques may be combined to provide for a more efficient water remediation system.

FIGS. 1-4 depict various embodiments of a water remediation system 10. The water remediation system may comprise a well 11 where a housing 12 containing components of the system 10 may be located. The well 11 may be formed (e.g., via drilling) having a sufficient depth where the well 11 extends below a water table 16 (e.g., an upper surface of a water pool 28). The housing 12 may be surrounded by a non-permeable casing 17 at an upper portion, and a permeable casing 14 (e.g., a casing having a screen 24 and permeable materials such as sand or gravel 15 contained therein) at and/or around the water table 16. Water may infiltrate the permeable casing 14 to form a water pool 28 within the housing 12. A water sprayer 45 and an air sparger 25 may be arranged within the housing 12.

The air sparger 25 may be located below the water table 16, and have associated therewith an air line 22 and a compressor 36. The compressor 36 may direct air (e.g., air from atmosphere) through the air line 22 to the air sparger 25. There, the air from the compressor 36 may be injected into the water pool 28 to create air bubbles 26. The air line 22 may be, in embodiments, a PVC pipe having a diameter of three-quarter inches. The compressor 36 may be configured such that the air directed by the compressor 36 has a pressure sufficient enough to overcome the water pressure of the water pool 28 at the submerged end of the sparger 25.

As air bubbles 26 rise through the water pool 11, the VOCs/PFASs that are contained within water pool 28 partition between the bubbles 26 and the water pool 28. A portion of the VOCs/PFASs may be carried to the surface of the pool 28 by the bubbles 26. The bubbles 26 then release the VOCs/PFASs into the air above the water pool 28. The amount of VOCs/PFASs which are removed from the pool 28 by becoming dissolved in the bubbles 26, and subsequently the air above the pool 28, may be dependent primarily on the partitioning equilibrium which is achieved between the vapor and liquid phase. This equilibrium is dependent upon the particular VOC/PFAS contaminant that is present in the water pool. Typically, the VOCs/PFASs which are most successfully removed using air sparging are the lighter types of petroleum constituents, such as benzene, ethyl benzene, toluene and xylene. Air sparging may be less effective at removing heavier organic compounds and petroleum products such as diesel fuel and kerosene.

Once the bubbles 26 have traveled through the water pool 28 and the VOCs contained in the water pool 28 have become partitioned between water and gas bubbles, the gas bubbles 26 may rise out of the water pool 28 as foam, and be pulled upwardly and out of the well 11 by a low pressure takeoff vent 62 (FIG. 4) and a vent line 32. The vent 62 and vent line 32 may be operably connected to a fan, vacuum pump, or blower 34 which may charge the vent 62 and the vent line 32 with a vacuum. The pressure in the vent line 32 may be monitored by a vacuum gauge 65. After the air or gas is removed from the well 11, the gas may be discharged to atmosphere and/or treated further in accordance with regulatory requirements.

Figure 2:
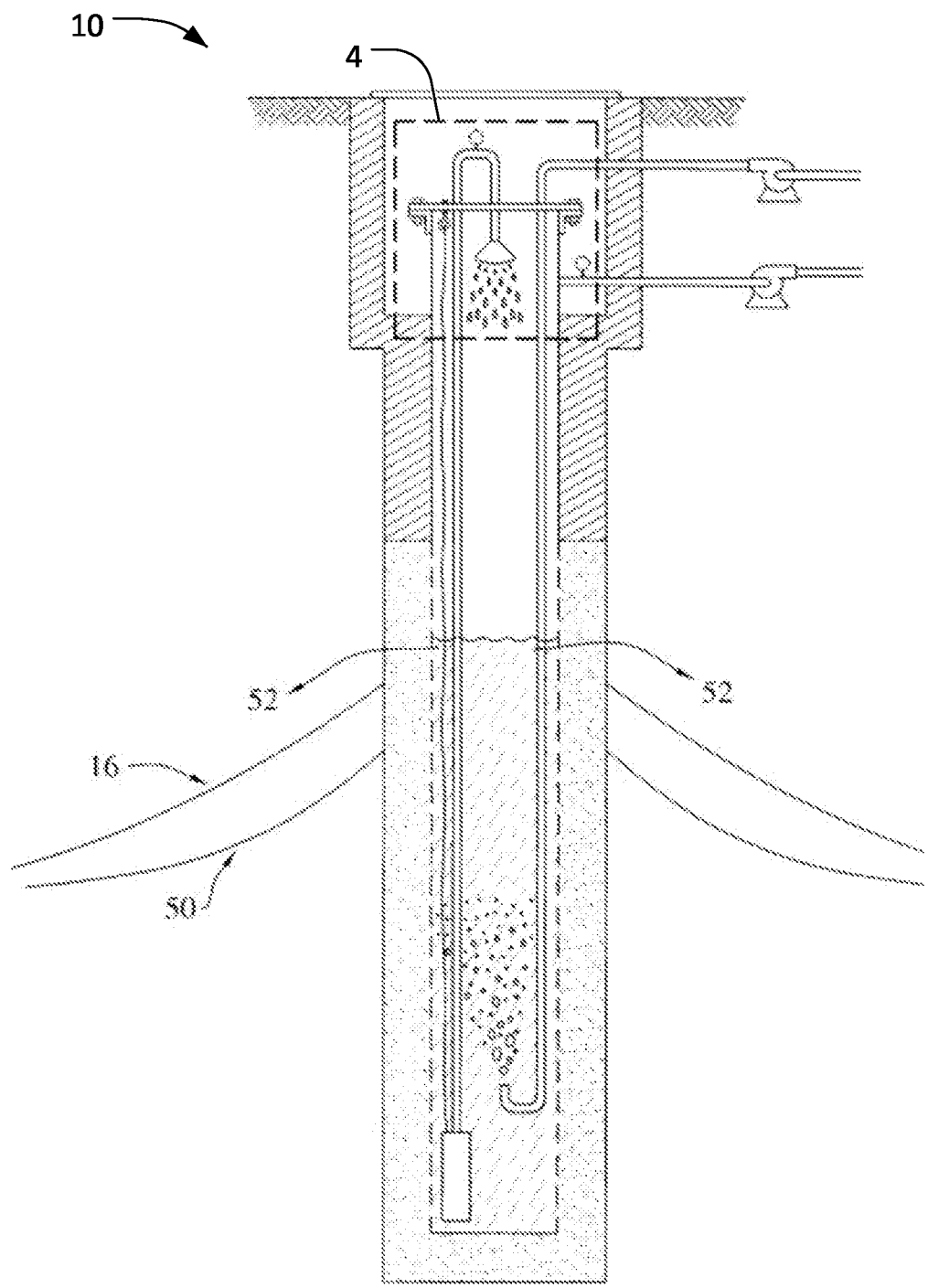

Besides removing the air contaminated with VOCs/PFASs by the bubbles 26, the vacuum provided by the pump 34 may provide a degree of suction to the surface of the water pool 28. This suction may result in a "mounding" of the water pool 28 at the well 11 and at portions of the water table 16 which are adjacent to the well. This mounding may result in a lifting of the water table 16 and an area of lower gradient pressure which enlarges the radius of influence of the well 11. Water cleaned by the sprayer 45 may fall on the top of this mound and propagate throughout the water table 16 more efficiently than in prior art systems which do not produce this mound. This is depicted in FIG. 2, where water exfiltration 52 falls out to create a water table 16 that may be higher than a water level 50 of a prior art system which does not make use of the same water mounding technique.

Figure 4:
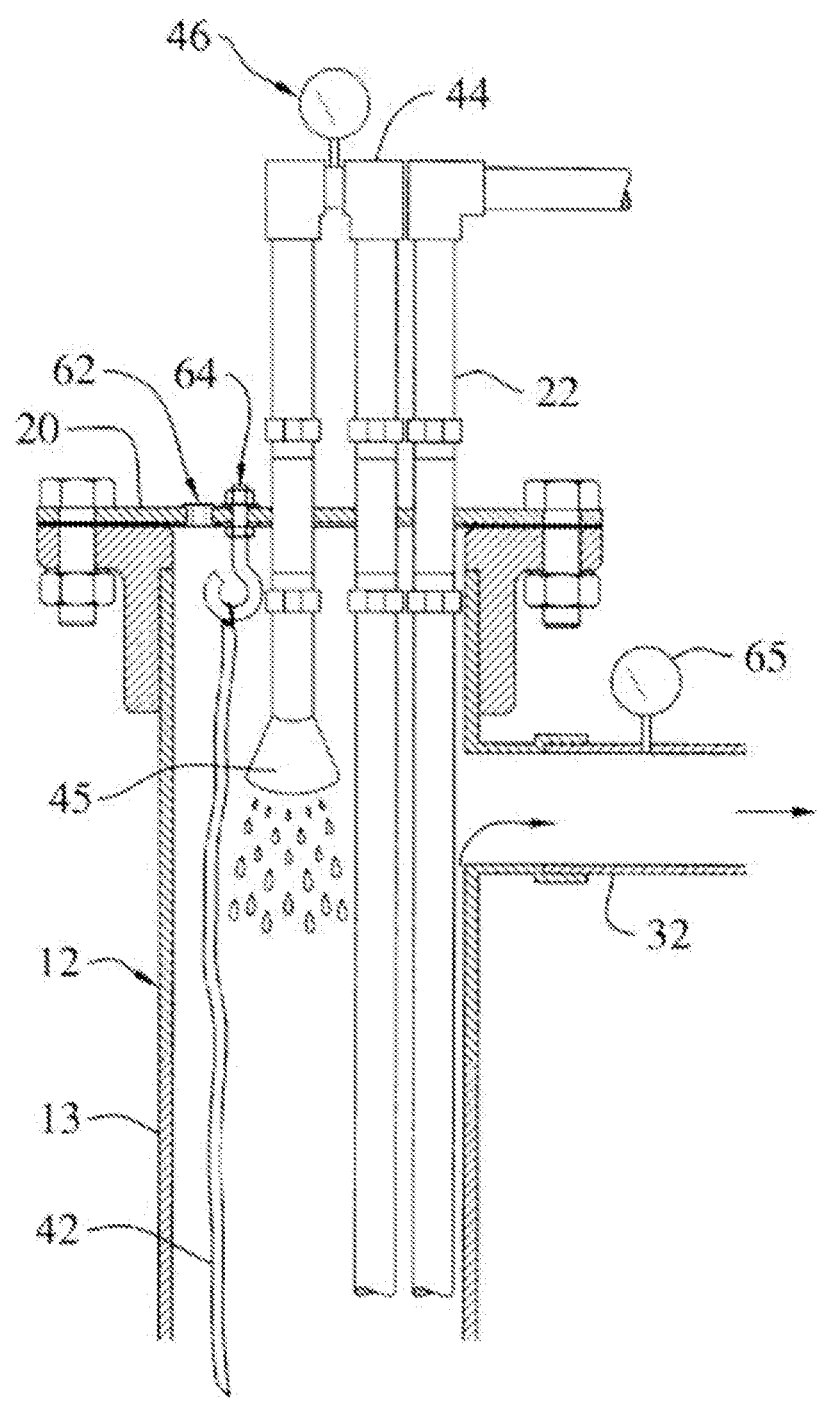

Attention is now directed to FIGS. 1 and 4, where, alternately or additionally to the air sparger 25, the well 11 may make use of a water sprayer 45 arranged at a lid 20 of the housing 12. Water from the well water pool 28 may be taken in by a submersible pump 40, pumped through water line 44 past pressure gauge 46 to the dispersion head 45, at which point the water from well water pool 28 may be sprayed into the air above the water table 16. As the contaminated water from the water pool 28 is sprayed, the droplets of water contact the air and the air absorbs some or all of the VOCs/PFASs therein. The submersible pump 40 may be supported above the bottom of the well 11 by wire or chain 42, which may connected to the lid 20 via a hook 64. This line 42 may additionally be used to supply energy to the submersible pump 40. Like with the gas bubbles 26, the VOCs/PFASs released into the air by the sprayer 45 may be extracted by the vent line 32 and vacuum pump 34.

During operation of the system 10 embodiments which makes use of both foaming and air stripping techniques, it will be appreciated by those skilled in the art that a portion of the gas contained in the head area already contains VOCs as the result of the gas bubbles/foam created by the air sparging tube 11. It may be possible that air bubbles which are emitted from the surface of the water pool 28 have not achieved equilibrium between the gas and liquid phase with respect to the VOCs contained therein. Spraying contaminated water from the sprayer 45 into the air of the head area may provide a second opportunity for equilibrium to be achieved. In this manner, the water remediation system 10 may have a greater extraction efficiency than can be obtained by systems which only use in-well foaming/sparging or air stripping techniques for the elimination of VOCs from contaminated water sources.

Figure 3:
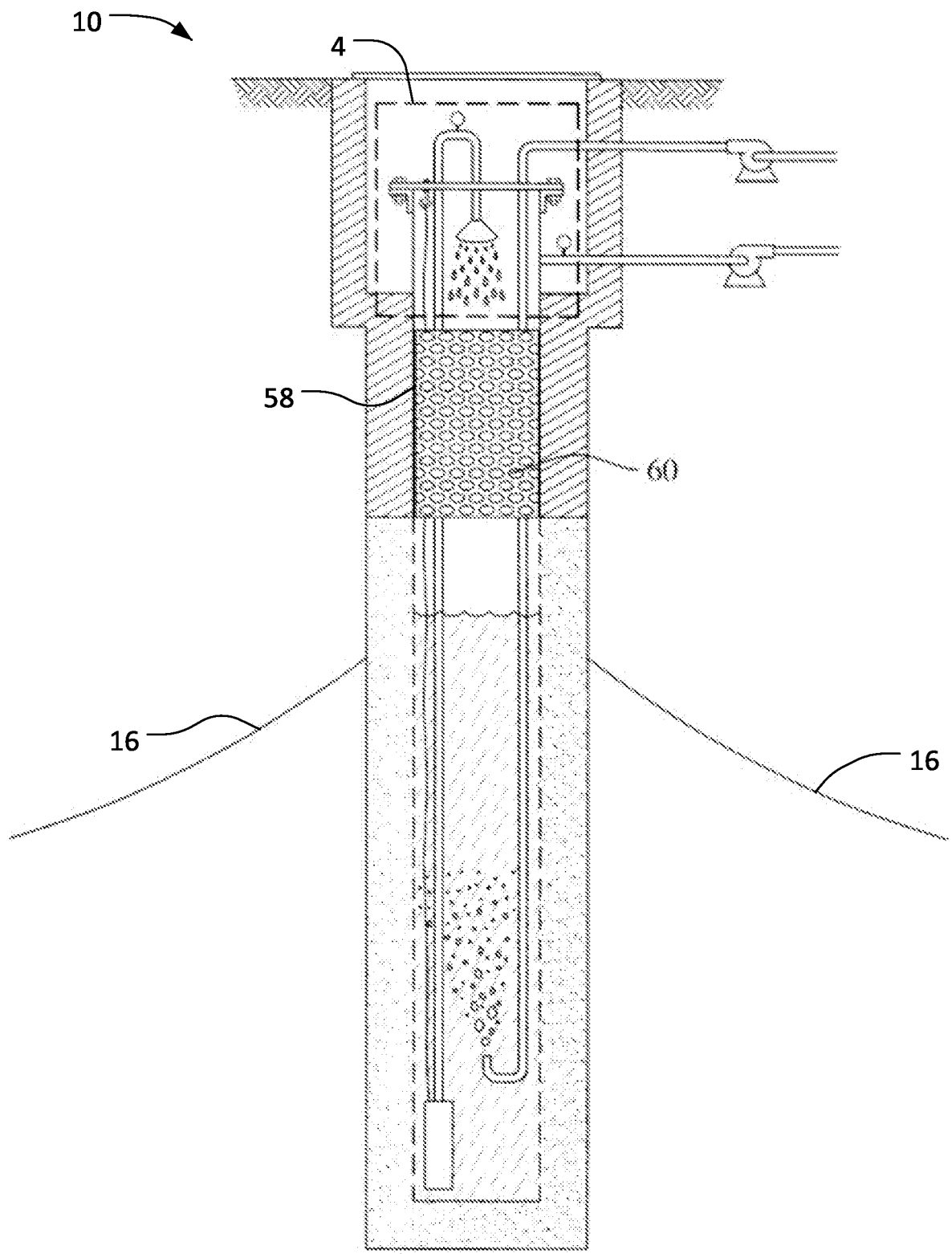

FIG. 3 depicts an embodiment of the water remediation system having a perforated screen 58 arranged between the water sprayer 45 and water table 16. The perforated screen 58 may have catalyst material 60 packed therein. Such catalyst materials 60 can be used to increase the surface area of the water released from the sprayer 45, which may increase the effectiveness of VOCs stripping. One type of catalyst material 60 that may be used is round objects such as plastic spheres. In operation, the amount of water surface area which is exposed to air may be increased, thereby increasing the efficiency of the spraying process.

An example operational example of the water remediation system 10 will now be described, in an embodiment. The system 10 was employed at a site in which tetrachloroethylene, a polychloroethene, (PCE) was found in both soil and in ground water. The highest level of PCE detected at the site at the time of installation was 2700 ppb, and there was a concentration of dissolved oxygen of approximately 1.23 ppm. Tetrachloroethylene (TCE) and dichloroethylene (DCE) concentrations were detected at levels of up to 250 ppb and 110 ppb, respectively, prior to treatment. A well was installed approximately 18 feet upgradient of a monitoring well and the well was extended to approximately 20 feet below the ground water table. The submersible pump was placed into the well at a depth of approximately 20 feet below the ground water table.

The system 10 employed fractionation via foaming, spraying, and sparging techniques for a period of 13 days. At the end of 13 days, testing was again conducted. The PCE concentration was reduced to 240 ppb (approximately a 90% reduction) and dissolved oxygen concentrations increased to approximately 9.57 ppm (i.e., almost saturation level). The TCE and DCE concentrations were reduced to below-detectable levels.

Figure 5:
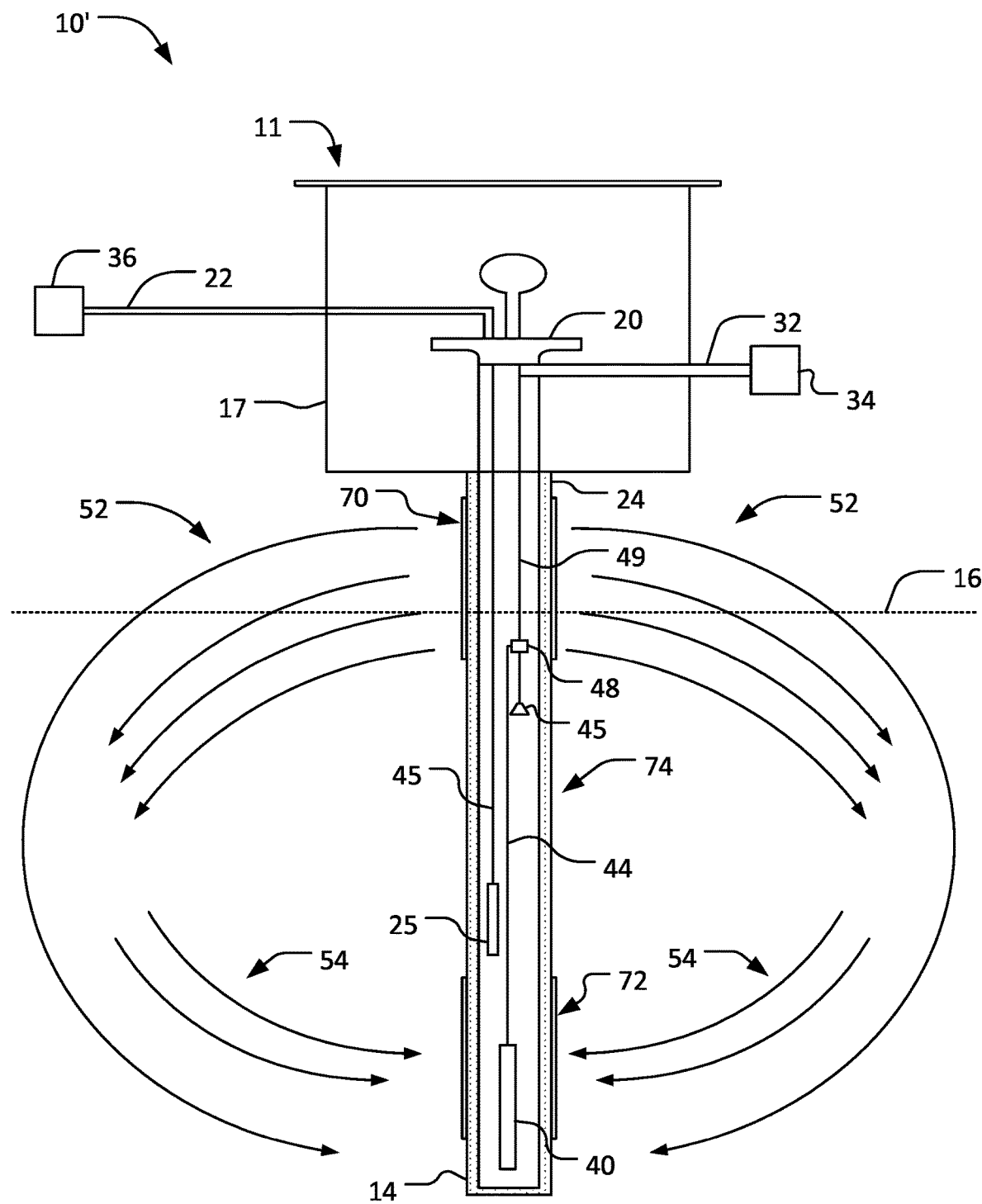

FIG. 5 depicts an embodiment 10' of a water remediation system which is substantially the same or similar to the system 10, except where explicitly stated or would be inherently implied. A primary difference between the system 10' and the system 10 is that the system 10' may arrange the sprayer 45 below the water table 16, as opposed above the water pool 28. Furthermore, the sprayer 45 may have associated with it a venturi connection 48 and an air line 49. The sprayer 45 may be enabled to inject both air (e.g., air supplied by the air line 22 and the compressor 36, air line 49, and the venturi connection 48) and water (e.g., water supplied by submersible pump 40 and water line 44) directly into the water pool 28. In this manner, the water remediation system 10' may provide increased foam production to the well 11 (e.g., by generating air bubbles in addition to those provided by the sparger 25) which may be extracted using the vent line 32 and the vacuum pump 34. The system 10' may further comprise upper injection screens 70 that allow liquids to exfiltrate 52 the well 11 and lower injection screens 72 to allow liquids to infiltrate the well 11. There may exist a "blind" section 74 that spans the distance between these sets of screens 70 and 72. The injection screens 70 and 72 may promote the recirculation of water in the pool 28, as well as the redistribution of contaminants within the well 11. Redistributing the contaminants may ease the removal thereof by, for example, precluding pockets of contaminants from building up within the well 11.

In embodiments, the sprayer 45 may be located between about two feet and five feet below the water table 16 to increase the foam production of the well 11. Air may be sparged through the sparger 25 at a rate of about three to ten Standard Cubic Feet per Minute (SCFM). Air may also be routed through the venturi connection 48 at about a rate of one to three SCFM. The sprayer 45 may inject water into the pool 28 at about a rate of six to twenty-five Gallons Per Minute (GPM). The artisan would understand that these injections rates of the system 10' may depend on the parameters of the well 11 and that the injection rates may be modified to suit a given well application. These variations are fully considered herein and are within the scope of the disclosure.

Example parameters of a well application that may influence the rate at which air is routed through the sparger 25 may be the water pool 28 depth, the column of water in the well 11, the depth of the sparger 25 underneath the water table 16, the length of the screens 70 and/or 72, the distance between the screens 70 and 72, et cetera. Example parameters of a well application that may influence the rate at which water is injected by the sprayer 45 may be the well 11 yield, the length of the screens 70 and/or 72, the water column in the well 11, the contaminant chemistry, the contaminant concentration, et cetera. In an example scenario where the well 11 is fifty feet deep and has a yield of about three GPM, the water remediation system 10' may inject air through the sparger 25 at a rate of about five to eight SCFM, and air/water at a rate of about eight to ten GPM through the sprayer 45. It is noted that the sprayer 45 rate of injection may be increased due to the air being routed through the venturi connection 48.

Producing a higher volume of gas bubbles in the well 11 may be advantageous when attempting to remove PFASs from the water pool 28. Due to their characteristics, PFASs may be more readily removed through gas bubbles formed in the water pool 28 than through spraying the contaminated water in the air. Furthermore, it has been found through Applicant's experiments that spraying water over the surface of the water pool 28 may destroy foam created by gas bubbles from air sparging. This would reduce the overall volume of foam created by air sparging, thus reducing the amount of contaminates which could be removed by the system. The system 10' may forego spraying water over the surface of the water pool 28 (i.e., the system 10' may forego the use of air tripping), which allows a greater volume of foam to be created, thus increasing the amount of PFASs which can be removed from the water pool 28. Furthermore, sprayer 45 may inject the combination of air and water at a high rate, since the mixing of air and water would increase the speed at which both are injected into the pool 28. That is to say, mixing the water from the pump 40 with air through the venturi connection 48 may increase the rate at which the water is sprayed into the pool 28 relative to the rate at which the water is pumped by the pump 40. In doing so, the sprayer 45 may generate an increased volume of foam over a system which only injects air into the pool 28. Furthermore, the high rate of spraying may raise the water table 16, and promote the recirculation of the water in water pool (e.g., by increasing the rate at which water exfiltrates 52 and infiltrates 54 the well 11).

Thus, as has been described, the water remediation system embodiments 10 and 10' described herein may provide for water remediation systems which may be more effective at reducing contaminants found in a water source than prior art systems, while providing this advantage with relatively low cost/effort (e.g., by removing contaminants efficiently on-site at the water source). The embodiments described herein may advantageously provide a water remediation system that may generate a large volume of foam for the effective removal of PFASs from a water source by spraying both air and water at a high rate below the water table, alternately or additionally to an air sparger. This high rate spraying may further elevate the water table, thereby increasing the effectiveness at which the vacuum system may remove the released contaminants.

In addition to the above identified features, options, controls, and components, system 10 may also include other features and functionalities, among other options, controls, and components. It will be appreciated by those skilled in the art that other various modifications could be made to the system, process, and method of use without parting from the spirit and scope of this disclosure. All such modifications and changes fall within the scope of the claims and are intended to be covered thereby.

In embodiments, the system 10 may include an onboard and/or a remote computing system. The remote computing device may have any suitable form or design configured to handle onboard computing operations, as may be necessary for the operation of system 10. The computing device may be connected with an electronic network, database, server, a Bluetooth network, and/or cloud via communication means. The remote computing system may comprise a processor, a memory, a microcontroller, a printed circuit board, a microprocessor, a receiver/transceiver, an antenna, a power supply, Bluetooth low energy chip, a global positioning system, and/or a communications system, among other components.

In embodiments, systems 10 and 10' may also include a sensor system. The sensor system may have any suitable form or design and may include one or more sensors and/or one or more sensing technologies. As one example, the sensor system may be configured to detect and communicate information related to systems 10, 10' and/or the environment of the system 10. In some embodiments, one or more various sensors may be used by the system 10 to detect system conditions such as distance, temperature changes, pressure, VOC/PFAS concentration, and other operating status parameters of system 10.

The water remediation system 10 and 10' embodiments disclosed herein may include or have associated therewith electronics (e.g., computing systems, control systems, remote servers, databases, application servers, application databases, remediation databases, mobile applications, et cetera). The electronics may be used to, for example, monitor the water remediation system. In some example embodiments, processor or processors used may be configured through particularly configured hardware, such as an application specific integrated circuit (ASIC), field-programmable gate array (FPGA), etc., and/or through execution of software to allow the water remediation system 10 to function in line with the requirements of a particular application. The water remediation system may be manufactured according to the disclosure herein and/or, in embodiments, a preexisting water remediation system may be adapted or retrofitted to perform the functions described herein.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

The invention claimed is:

1. A water remediation system being situated at a site having a well with a water pool, the water pool having an upper surface and an air section above the water pool, the system comprising:
 - a compressor for generating a first portion of compressed air and a second portion of compressed air;
 - a submersible pump submerged below the upper surface of the water pool, the submersible pump being configured to pump a source of water at a first rate;
 - an air sparger operably coupled to the compressor, the air sparger being configured to inject the first portion of compressed air into the water pool;
 - a sprayer submerged a distance below the upper surface of the water pool, the sprayer being operably coupled to both the submersible pump and the compressor through a venturi connection, the sprayer being configured to collectively spray into the water pool at a second rate a combination of the source of water from the submersible pump and the second portion of compressed air; and a vacuum pump configured to charge the air section with a vacuum;

wherein:

the sprayer and the air sparger are configured to generate foam having contaminants, the foam being configured to release the contaminants into the air section; and the vacuum pump directs the contaminants out of the air section.

2. The system of claim 1, wherein the contaminants comprise per- and polyfluoroalkyl substances.

3. The system of claim 1, wherein the second rate is disparate from the first rate.

4. The system of claim 3, wherein the second rate is higher than the first rate.

5. The system of claim 1, wherein the water remediation system is arranged entirely at the site of the well.

6. The system of claim 1, wherein the upper surface of the well rises during operation of the water remediation system.

7. The system of claim 1, further comprising a permeable upper screen and a permeable lower screen arranged below the upper screen.

8. The system of claim 7, wherein water from the water pool circulates out of the water pool through the upper screen, and circulates back into the water pool through the lower screen.

9. The system of claim 7, further comprising a blind section, the blind section being an area between the upper screen and the lower screen that is devoid of water permeable screens.

10. The system of claim 1, wherein the distance the sprayer is submerged below the upper surface of water pool is in a range of about two to five feet.

11. The system of claim 1, further comprising a non-permeable casing arranged around a portion of the air section.

12. The system of claim 11, further comprising a permeable casing arranged around a portion of the water pool, the permeable casing containing at least one of sand and gravel.

13. The system of claim 1, further comprising a lid and a power line, the power line being coupled to both the lid and the submersible pump, the power line being configured to provide power to the submersible pump.

14. The system of claim 1, wherein the water remediation system only injects water and air below the upper surface of the water pool.

15. A water remediation system being situated at a site having a well with a water pool, the water pool having an upper surface and an air section above the water pool, the system comprising:

a compressor for generating compressed air;

a submersible pump submerged below the upper surface of the water pool, the submersible pump being configured to pump a source of water;

an air sparger operably coupled to the compressor, the air sparger being configured to inject the compressed air into the water pool;

a sprayer being operably coupled to the submersible pump; and a vacuum pump configured to charge the air section with a vacuum;

wherein:

the air sparger is configured to generate foam having contaminants, the foam being configured to release the contaminants into the air section;

the sprayer is configured to spray water from the submersible pump; and the vacuum pump directs the contaminants out of the air section;

the sprayer is arranged below the upper surface of water pool and is configured to spray water from the submersible pump directly into the water pool.

16. The system of claim 15, wherein the sprayer is arranged above the upper surface of the water pool and is configured to spray water from the submersible pump into the air section.

17. The system of claim 16, further comprising a perforated screen arranged between the sprayer and the upper surface of the water pool, the perforated screen having a catalyst material.

18. The system of claim 15, wherein the sprayer is operably coupled to the compressor by a venturi connection, and is further configured to spray air from the compressor directly into the water pool.

19. A water remediation system being situated at a site having a well with a water pool, the water pool having an upper surface and an air section above the water pool, the system comprising:

a compressor for generating a first portion of compressed air and a second portion of compressed air;

a submersible pump submerged below the upper surface of the water pool, the submersible pump being configured to pump a source of water;

a venturi connection coupled to the compressor and configured to direct the second portion of compressed air;

a sprayer submerged a distance below the upper surface of the water pool, the sprayer being operably coupled to both the submersible pump and the venturi connection, the sprayer being configured to collectively spray into the water pool a combination of the source of water from the submersible pump and the second portion of compressed air from the venturi connection; and a vacuum pump configured to charge the air section with a vacuum;

wherein:

the sprayer is configured to generate foam having contaminants, the foam being configured to release the contaminants into the air section; and the vacuum pump directs the contaminants out of the air section.

* * * * *